(12) United States Patent
Huang et al.

(10) Patent No.: US 10,497,693 B1
(45) Date of Patent: Dec. 3, 2019

(54) FRACTIONAL-HEIGHT TRANSITIONAL CELL FOR SEMICONDUCTOR DEVICE LAYOUT

(71) Applicant: Arm Limited, Cambridge (GB)

(72) Inventors: Chihwei Huang, Austin, TX (US); Ashwani Kumar Srivastava, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/039,255

(22) Filed: Jul. 18, 2018

(51) Int. Cl.
*H01L 29/76* (2006.01)
*H01L 27/02* (2006.01)
*H01L 27/092* (2006.01)
*G06F 17/50* (2006.01)
*H01L 23/528* (2006.01)

(52) U.S. Cl.
CPC ...... *H01L 27/0207* (2013.01); *G06F 17/5072* (2013.01); *H01L 23/5286* (2013.01); *H01L 27/0924* (2013.01); *G06F 2217/02* (2013.01)

(58) Field of Classification Search
CPC ............ H01L 27/0207; H01L 27/0924; H01L 23/5286; G06F 17/5072; G06F 2217/02
USPC ........................................................ 257/369
See application file for complete search history.

(56) References Cited

U.S. PATENT DOCUMENTS

2017/0092638 A1     3/2017   Jung
2018/0075182 A1*    3/2018   Zhuang ............... G06F 17/5081

* cited by examiner

*Primary Examiner* — Tu-Tu V Ho
(74) *Attorney, Agent, or Firm* — Berkeley Law & Technology Group, LLP (57) ABSTRACT

Subject matter disclosed herein relates generally to semiconductor devices, and, more particularly, to semiconductor device layout, including, for example, cells incorporating finFET-type devices. A semiconductor device may include finFET-type devices, for example, arranged in a standard cell architecture including fractional-height cells.

25 Claims, 9 Drawing Sheets

FRACTIONAL-HEIGHT TRANSITIONAL CELL FOR SEMICONDUCTOR DEVICE LAYOUT

BACKGROUND

Field

Subject matter disclosed herein relates generally to semiconductor devices, and, more particularly, to semiconductor device cell layout, including, for example, cells incorporating finFET-type devices.

Information

In some instances, integrated circuits may be designed based on desired functions using cells from a cell library which may be combined using computer-based layout tools to form desired circuits. Also, in some instances, cell libraries may be based on finFET-based design architectures which have gained increasing acceptance in response to continued desires for lower power, increased performance, and/or more compact designs. For example, transistors based on finFET-based design architectures may be relatively much smaller than previous metal oxide semiconductor field effect transistor (MOSFET) transistors, thereby pushing the scaling of semiconductor transistors down to a nanometer scale, in some instances. FinFET-based design architectures may, for example, provide relatively more compact and/or relatively faster integrated circuits, and/or may allow for a reduction in power consumption.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, in some instances, integrated circuits may be designed based on desired functions using cells from a cell library which may be combined using computer-based layout tools to form desired circuits. Also, in some instances, cell libraries may be based on finFET-based design architectures which have gained increasing acceptance in response to continued desires for lower power, increased performance, and/or more compact designs. For example, transistors based on finFET-based design architectures may be relatively much smaller than previous MOSFET transistors, thereby pushing the scaling of semiconductor transistors down to a nanometer scale, in some instances. FinFET-based design architectures may, for example, provide relatively more compact and/or relatively faster integrated circuits, and/or may allow for a reduction in power consumption.

Figure 1:
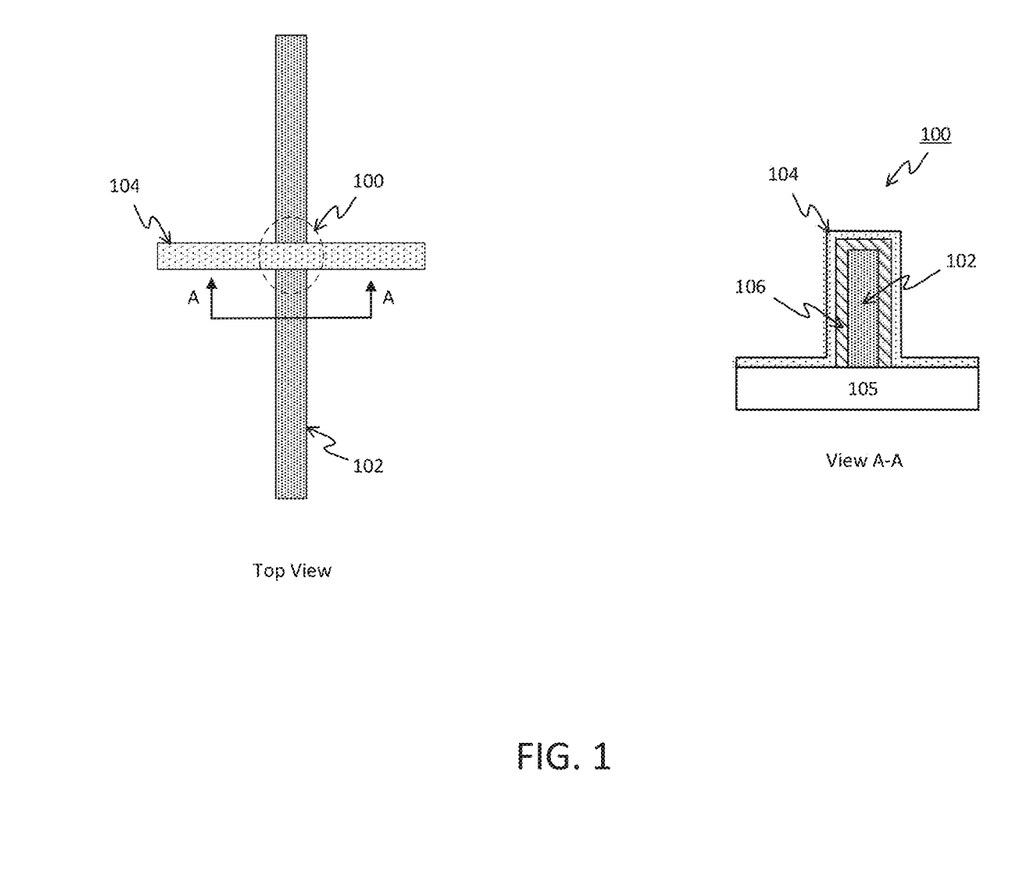
FIG. 1 is an illustration of an example finFET transistor structure, in accordance with an embodiment.

As utilized herein, "finFET" refers to a cell architecture of a semiconductor device characterized at least in part by pluralities of fins of one or more diffusion types. "Fin" refers to an elongated and/or linear diffusion structure of a substantially rectangular and/or substantially triangular cross-section, for example, projecting upward from an underlying substrate. For example, FIG. 1 depicts an example layout view of an embodiment 100 of an example finFET transistor structure. A top view and a cross-sectional view are depicted. In an embodiment, a finFET transistor, such as finFET transistor 100, may be constructed of a fin, such as fin 102, of a particular diffusion type. For example, fin 102 may comprise an n-type diffusion material in an embodiment. In other embodiments, fin 102 may comprise a p-type diffusion material. In an embodiment, a fin, such as fin 102, may be formed of any of a variety of materials including, for example, silicon, silicon germanium, germanium, etc., to name but a few examples. Further, in an embodiment, a gate electrode, such as gate electrode 104, may comprise one or more electrically conductive materials such as, for example, a film of titanium nitride and/or tantalum nitride covered by polysilicon. Additionally, in an embodiment, a gate oxide layer, such as gate oxide layer 106, may be formed of any of a variety of dielectric materials, including silicon dioxide, for example. However, claimed subject matter is not limited in scope in these respects.

Also, although FIG. 1 depicts a fin 102 having a substantially rectangular cross-section substantially vertically projecting from a substrate 105, other embodiments may include fins of different shapes. For example, a fin, such as fin 102, may have a somewhat and/or substantially triangular cross-section, in an embodiment. However, again, claimed subject matter is not limited in scope in these respects.

In some instances, a cell library may include one or more standard-height cells. As used herein, "standard-height" refers to a particular height specified for a particular cell library. For example, a cell having a "standard" height may be said to comprise a "standard-height," "single-height," and/or a "1.0-height" cell. In an embodiment, a cell library may include single-height cells of varying widths. Also, in an embodiment, a cell library may include cells having heights other than a standard height. For example, as discussed below, an example semiconductor device layout may include one or more single-height cells and/or one or more double-height cells. Cells of other heights may also be incorporated. In embodiments, double-height cells comprise double-height cells with NWELL offset (discussed more fully below). As utilized herein, "double-height cells with NWELL offset" are referred to as "double-height cells". As also discussed below, transitions in a layout between single-height cells and double-height cells, for example, may pose challenges. For example, in some instances, double-height cells ensure that supply voltage electrodes, such as VDD and/or VSS electrodes, for example, match-up between single-height cells and abutting double-height cells to ensure conductivity of supply voltage signals between cells. For example, in situations wherein double-height cells abut single-height cells across one or more rows in a semiconductor device layout, filler regions comprising one-half of a standard cell height may be utilized to provide the desired offset for double-height cells, as explained more fully below. However, utilization of filler regions to provide offset for double-height cells may result in a disadvantageous under-utilization of semiconductor die area, as also explained more fully below.

Figure 2:
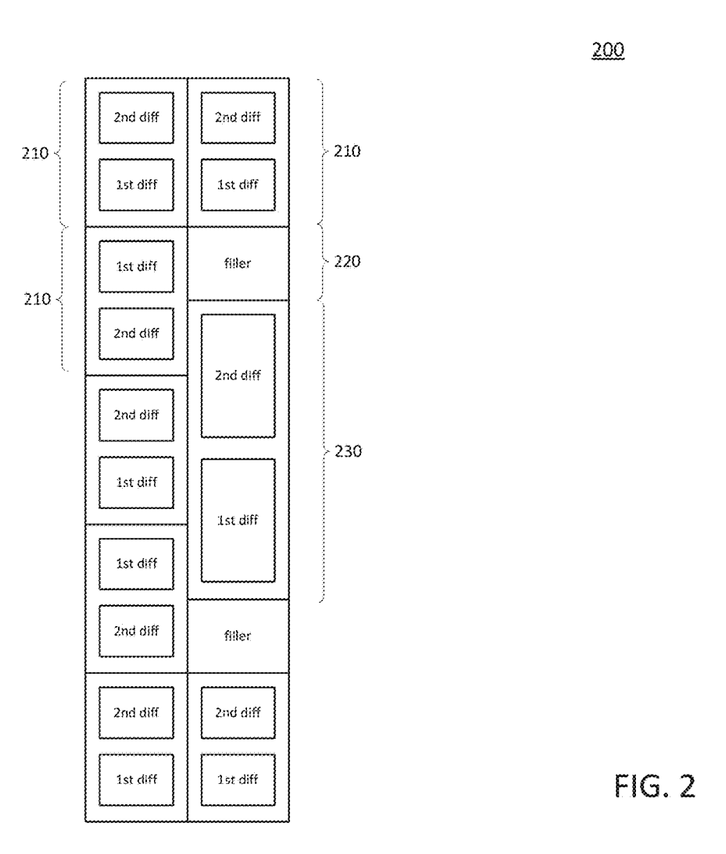
FIG. 2 is an illustration depicting an example layout of cells, including standard-height cells and double-height cells with NWELL offset, from a cell library, in accordance with an embodiment.

FIG. 2 is an illustration depicting an embodiment 200 of a portion of an example semiconductor device including an example layout of cells. For example semiconductor device layout 200, a plurality of single-height cells 210 are included. Also depicted for example semiconductor device layout 200 is a double-height cell 230. In an embodiment, individual cells, such as cells 210 and/or 230, may include a plurality of fins of a first diffusion type and another plurality of fins of a second diffusion type, as depicted in example layout 200. Further, as mentioned, double-height cells, such as cell 230, comprise double-height cells with NWELL offset, in an embodiment. As also mentioned, "NWELL offset" is described more fully, below.

As mentioned above, in some instances, filler regions, such as filler regions 220, may be inserted into a semiconductor device layout to provide an offset for particular cells, such as double-height cell 230, for example. Further, in some instances, filler regions, such as filler regions 220, may have a height of one-half of a single-height cell. For example, double-height cell 230 abuts single-height cells 210 with an offset of one-half of a standard cell height. In some instances, filler regions, such as filler regions 220, may include unused fins and/or may provide little or no function. Filler regions, such as filler regions 220, may incur a cost with respect to semiconductor die area utilization, for example. Techniques to reduce an amount of semiconductor die area that is devoted to filler regions to provide transitions between single-height cells and double-height cells, for example, would be advantageous.

Figure 3:
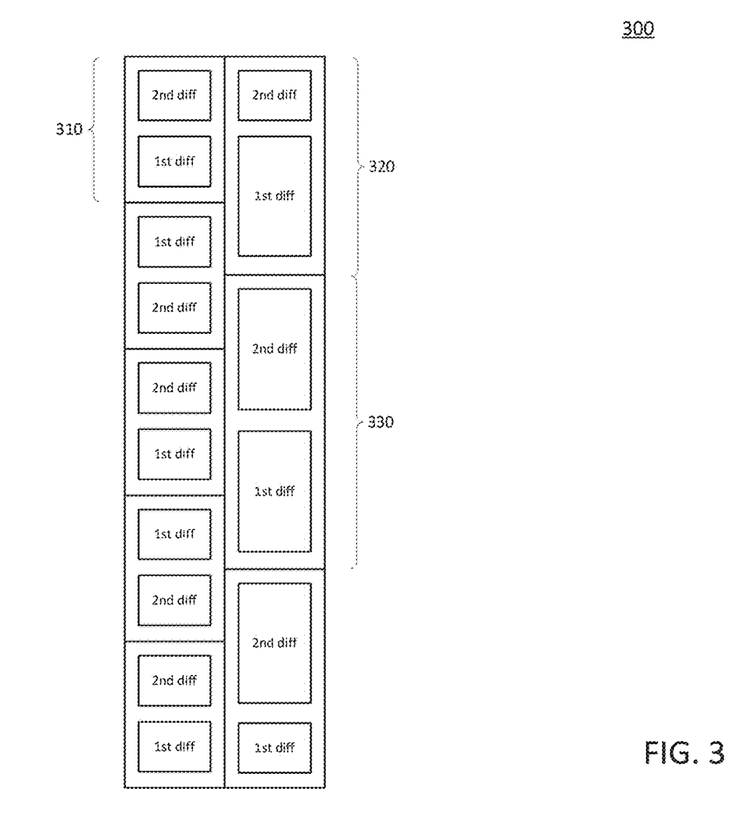
FIG. 3 is an illustration depicting an example layout of cells, including fractional-height transitional cells, from a cell library, in accordance with an embodiment.

FIG. 3 is an illustration depicting an example layout 300 for at least a portion of a semiconductor device. For example semiconductor device layout 300, a plurality of single-height cells 310 are included, as well as an example double-height cell 330. Further, similar to example layout 200 described above, individual cells, such as cells 310 and/or 330, may include a plurality of fins of a first diffusion type and another plurality of fins of a second diffusion type, as depicted in example layout 300. Also, similar to example layout 200 described above, double-height cells, such as double-height cell 330, abut single-height cells, such as single-height cells 310, with an offset of half-standard cell height. That is, in an embodiment, a double-height cell, such as double-height cell 330, may be offset with respect to an abutting single-height cell, such as a cell 310, by a height that is one-half that of a single-height cell.

As mentioned, utilization of filler regions, such as filler regions 220, to facilitate offset of double-height cells, for example, may result in a disadvantageous underutilization of semiconductor die area. For example, filler regions, such as filler regions 220, may include unused fins and/or may provide little or no function. Thus, semiconductor die area devoted to filler regions is not able to contribute to chip functionality, for example. To help address at least some of the deficiencies and/or disadvantages of filler region utilization in semiconductor device layouts employing double-height cell offset, for example, embodiments may incorporate one or more fractional-height cells. "Fractional-height" refers to a height comprising a non-integer multiple of a standard height. For example, fractional-height cells, such as cells 320, may have a height that is approximately 1.5 times that of a single-height cell, such as cell 310. In an embodiment, utilization of a fractional-height cell may allow for use of areas of a semiconductor die that might otherwise be used for filler regions in some instances. For example, the filler regions 220 depicted in example layout 200 may be replaced at least in part by active regions of fractional-height cells 320. In an embodiment, fractional-height cells, such as cell 320, may comprise functional cells that may form part of a cell library. Further, as discussed, fractional-height cells may be utilized to transition between single-height cells, such as single-height cells 310, and double-height cells, such as double-height cell 330.

In an embodiment, by replacing a single-height cell and filler region with a fractional-height cell, an increased number of usable fins may result. For example, a fractional-height cell having a height of approximately 1.5 times that of a single-height cell may double or more a count of fins of a particular diffusion type as compared with a count of fins of that particular diffusion type in a single-height cell by converting filler region fins to active fins and/or utilizing fins positioned under a power rail. In an embodiment, a 1.0-height cell may include 2 n-type fins and 2 p-type fins, for example. Further, in an embodiment, a 1.5-height cell may comprise 2 p-type fins and may comprise 6 n-type fins, for example. In another embodiment, a 1.5-height cell may comprise 2 n-type fins and may comprise 6 p-type fins, for example. More generally, a fractional-height cell may have a height that is a non-integer multiple of a single-height cell, wherein the height of the fractional-height cell is greater than the single-height cell, in an embodiment. Also, in an embodiment, a variety of ratios of p-type to n-type fins may be implemented. In an embodiment, an increase in a count of usable fins for a particular cell, such as transitional cell 320, may result in increased drive strength for that particular cell, potentially resulting in an increase in circuit performance, as discussed more fully below.

In addition to providing an increase in drive strength (e.g., due to an increased number of usable fins) through replacing a single-height cell and filler region with a fractional-height transitional cell, embodiments may also provide an advantage of a greater device density per unit area for a semiconductor device, for example. In an embodiment, greater device density per unit area may result in various potential advantages, including, for example, cost reductions, improved circuit performance, reductions in power consumption, etc.

Figure 4:
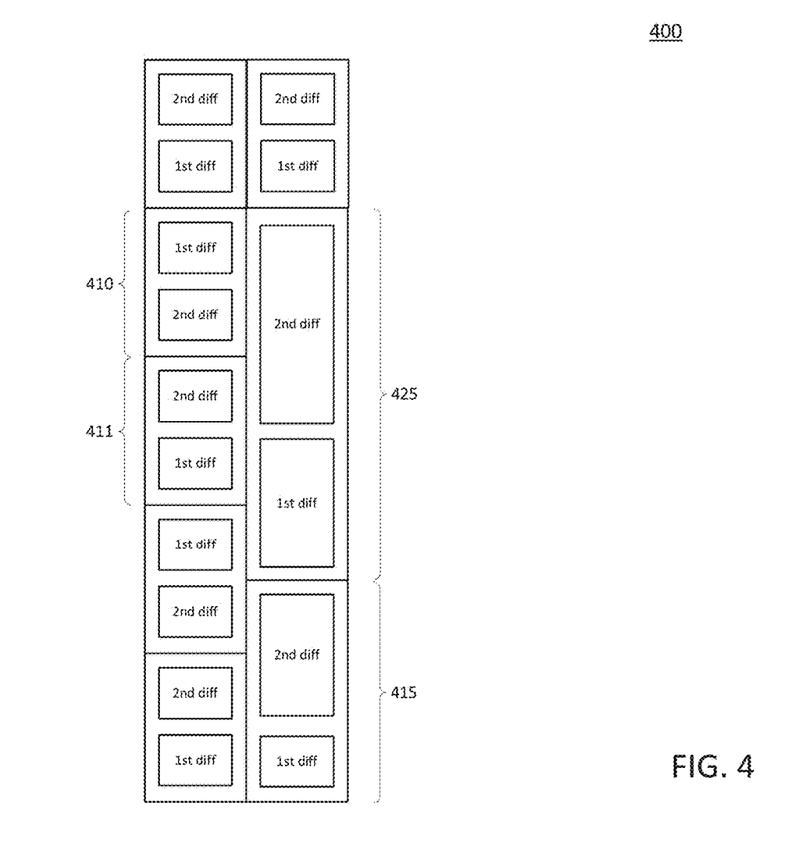
FIG. 4 is an illustration depicting an example layout of cells, including fractional-height transitional cells, from a cell library, in accordance with an embodiment.

FIG. 4 is an illustration depicting an example layout 400 for at least a portion of a semiconductor device. For example semiconductor device layout 400, a plurality of single-height cells, such as cell 410 and/or cell 411, are included, as well as an example 2.5-height cell 425 and an example 1.5-height transitional cell 415. Further, similar to example layouts 200 and/or 300 described above, individual cells, such as cells 410, 411, 415, and/or 425, for example, may include a plurality of fins of a first diffusion type and another plurality of fins of a second diffusion type, as depicted in example layout 400. In an embodiment, a 2.5-height cell, such as cell 425, abuts a single-height cell, such as single-height cell 410, directly (e.g., no transition cell utilized). To abut another particular single-height cell, such as single-height cell 411, a transitional cell, such as 1.5-height cell 415, may be utilized, in an embodiment.

In an embodiment, 2.5-height cells, for example, may comprise active fins of both n-type and p-type diffusion. Further, in an embodiment, some of the n-type and p-type fins for 2.5-height cells may be formed to be positioned under supply voltage electrodes and/or common source electrodes. Additionally, in an embodiment, 2.5-height cells, for example, may comprise extra fins as compared with double-height cells due, at least in part, to filler cell pins being converted to active fins and due, at least in part, to utilization of fins in transitional regions that would otherwise go unused. Utilization of fins positioned under supply voltage and/or common source electrodes and/or utilization of fins in transitional regions may allow for an increased count of active fins, and therefore an improved utilization of semiconductor die area, in an embodiment.

Figure 5:
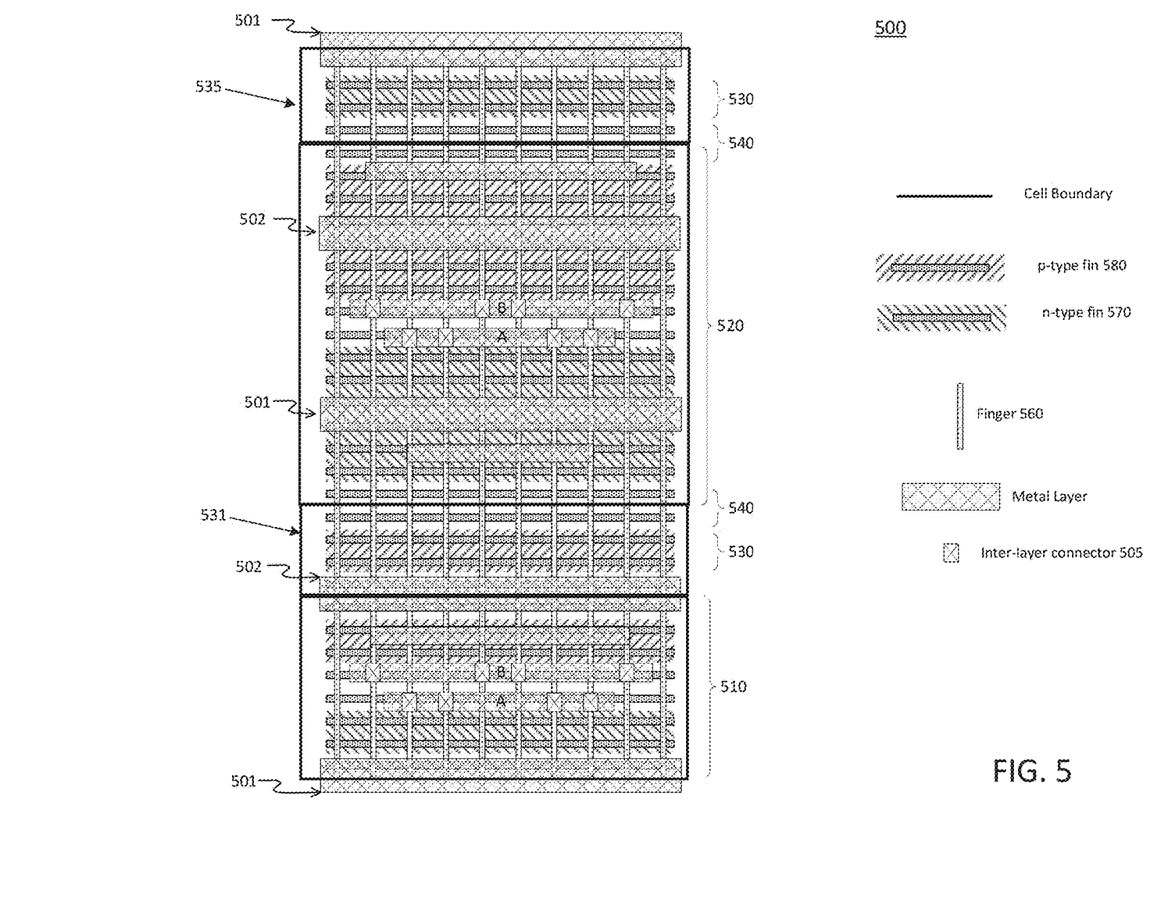
FIG. 5 is an illustration showing an example finFET layout including standard-height cells and double-height cells with NWELL offset, in accordance with an embodiment.

FIG. 5 is an illustration showing an embodiment 500 of example finFET semiconductor device layout including a standard-height cell, such as cell 510, and a double-height cell, such as cell 520. As depicted in example layout 500, a standard-height cell, such as cell 510, and/or a double-height cell, such as cell 520, may include a plurality of p-type fins, such as fins 580, and a plurality of n-type fins, such as fins 570. As also depicted in example layout 500, the various cells, such as standard-height cell 510 and/or double-height cell 520, may include a plurality of fingers, such as fingers 560, aligned in a direction substantially orthogonal to fins 570 and/or 580. Example layout 500 further depicts elements of a metal layer, including voltage supply electrodes 501 and/or 502. In an embodiment, voltage supply electrodes 501 may comprise a common source (VSS) electrode, and voltage supply electrodes 502 may comprise a supply voltage (VDD) electrode, for example. Also depicted in example layout 500 are inter-layer interconnectors 505. For the purposes of this discussion, circuit input terminals A and/or B and associated metal layer electrodes and/or inter-layer interconnects 505 are merely examples, and claimed subject matter is not limited in scope to any particular arrangement, configuration, and/or count of input electrodes and/or inter-layer connectors. Further, claimed subject matter is not limited in scope to any other particular aspects of circuit configuration, such as pertaining to cells 510 and/or 520, for example. For example, techniques described herein may be applied to any of a wide range of cell and/or circuit types and/or configurations.

As depicted in example layout 500, in some instances, combinations of single-height cells, such as cell 510, and/or double-height cells, such as cell 520, may be implemented in conjunction with filler cells, such as cells 531 and/or 535. For example, filler cells 531 and/or 535 may include, for example, unused fins, such as fins 540, and that may also include, for example, half-filler cell regions 530. As mentioned, fins within a filler region, such as fins within regions 530 and/or 540, may be unused in some instances, such as example layout 500. Additionally, fins beneath supply voltage electrodes of single-height cells, such as fins beneath VSS electrodes 501 and/or beneath VDD electrodes 502 of single-height cell 510, may be unused in example layout 500.

For example layout 500, a single-height cell, such as cell 510, may comprise 2 n-type fins, such as n-type fins 570, and 2 p-type fins, such as p-type fins 580. Also, for example layout 500, a double-height cell, such as double-height cell 520, may include 6 n-type fins, such as n-type fins 570, and 6 p-type fins, such as p-type fins 580. For each of cells 510 and/or 520, a ratio of p-type fins to n-type fins (e.g., a "beta" ratio P/N) may comprise a ratio of 1:1. Of course, layout 500 is merely an example, and claimed subject matter is not limited in scope in these respects.

As mentioned, a double-height cell, such as double-height cell 520, may be referred to as a "double-height cell with NWELL offset." In an embodiment, p-type fins, such as fins 580, may be formed over an NWELL structure within a substrate. In an embodiment, a double-height cell, such as cell 520, including an NWELL region, may be characterized at least in part by inset power rails, such as power rails 501 and 502. For example, for double-height cell 520, power rails 501 and/or 502 may be inset, such as depicted in FIG. 5, so as to align with respective power rails of other cells within a logic block.

Figure 6:
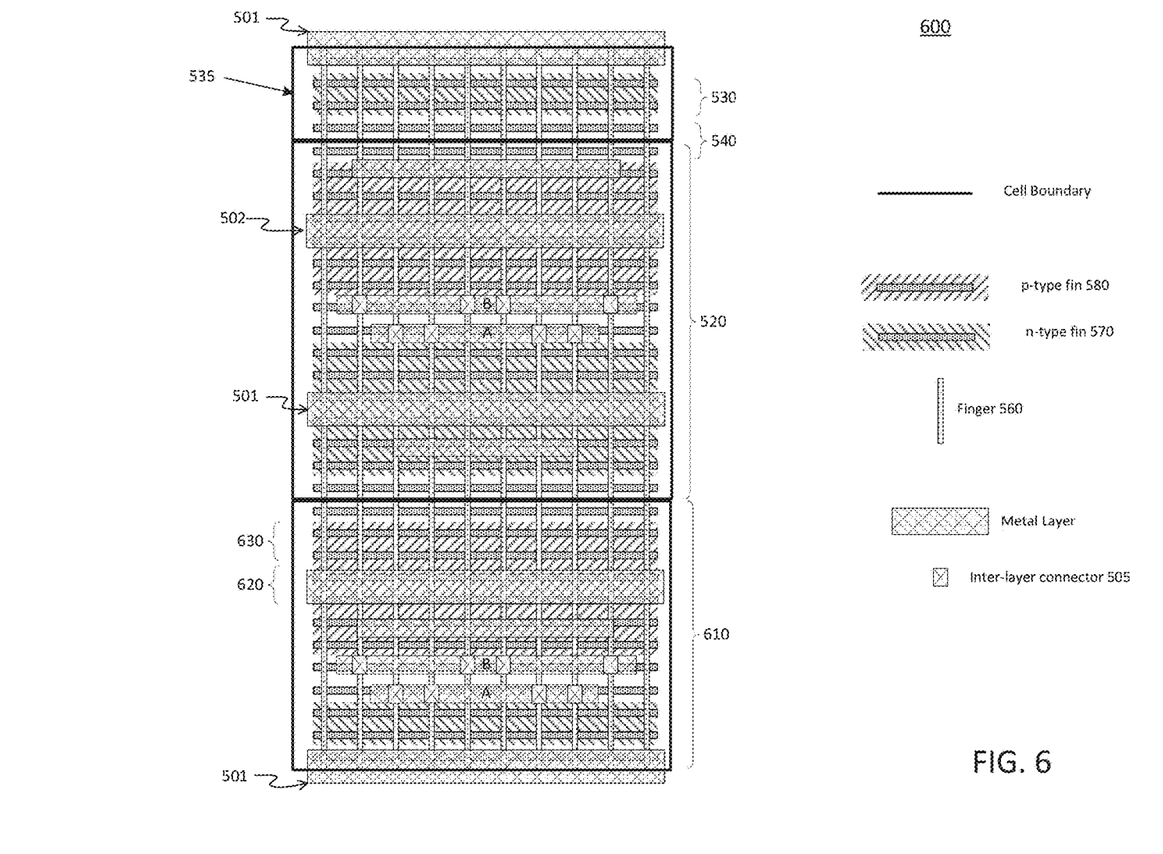
FIG. 6 is an illustration depicting an example finFET layout, including a fractional-height transitional cell, in accordance with an embodiment.

FIG. 6 is an illustration depicting an embodiment 500 of an example finFET layout including an example fractional-height transitional cell, such as cell 610. In an embodiment, layout 600 may share some similarities with example layout 500, discussed above. For example, a double-height cell, such as cell 520, may include a plurality of p-type fins, such as fins 580, and a plurality of n-type fins, such as fins 570. Also, example layout 500 may include a plurality of fingers, such as fingers 560, aligned in a direction substantially orthogonal to fins 570 and/or 580. Example layout 600 further depicts portions of a metal layer, including voltage supply electrodes 501 and/or 502. Example layout 600 further depicts inter-layer interconnectors 505. As mentioned above, circuit input terminals A and/or B and associated metal layer electrodes and/or inter-layer interconnects 505 are merely examples, and claimed subject matter is not limited in scope to any particular arrangement, configuration, and/or count of input electrodes and/or inter-layer connectors. Further, claimed subject matter is not limited in scope to any other particular aspects of circuit configuration, such as pertaining to cells 610 and/or 520, for example.

In an embodiment, example layout 600 may comprise a combination of fractional-height transitional cells, such as cell 610, and/or double-height cells, such as cell 520. Example layout 600 also depicts that fins from a half-standard cell height filler region 530 and from beneath a supply voltage electrode 502 are incorporated into a fractional-height transitional cell, such as cell 610. For example layout 500, a fractional-height transitional cell, such as cell 610, may comprise 2 n-type fins, such as n-type fins 570, and 6 p-type fins, such as p-type fins 580. Also, for example layout 600, as with example 500 discussed above, a double-height cell, such as double-height cell 520, may include 6 n-type fins, such as n-type fins 570, and 6 p-type fins, such as p-type fins 580. For cell 520, a beta ratio of p-type fins to n-type fins may have a value of 1.0. For fractional-height transitional cell 610, due at least in part to contributions from fins in region 620 beneath a supply voltage electrode 502 and fins in region 630, a beta ratio of p-type fins to n-type fins for fractional-height transitional cell 610 has a value of approximately 3.0 (e.g., 6 p-type fins and 2 n-type fins). Of course, layout 600 is merely an example, and claimed subject matter is not limited in scope in these respects.

As may be discerned through viewing example layout 500 of FIG. 5 and example layout 600 of FIG. 6, implementation of a fractional-height transitional cell, such as cell 610, rather than implementing a single-height cell and a corresponding filler region, a greater number of fins may be incorporated and/or utilized for a similar semiconductor die area. A greater number of fins within a similar area results in an increase in device density, for example. In an embodiment, greater device density may result in various potential advantages, including, for example, cost reductions, improved circuit performance, reductions in power consumption, etc.

Figure 7:
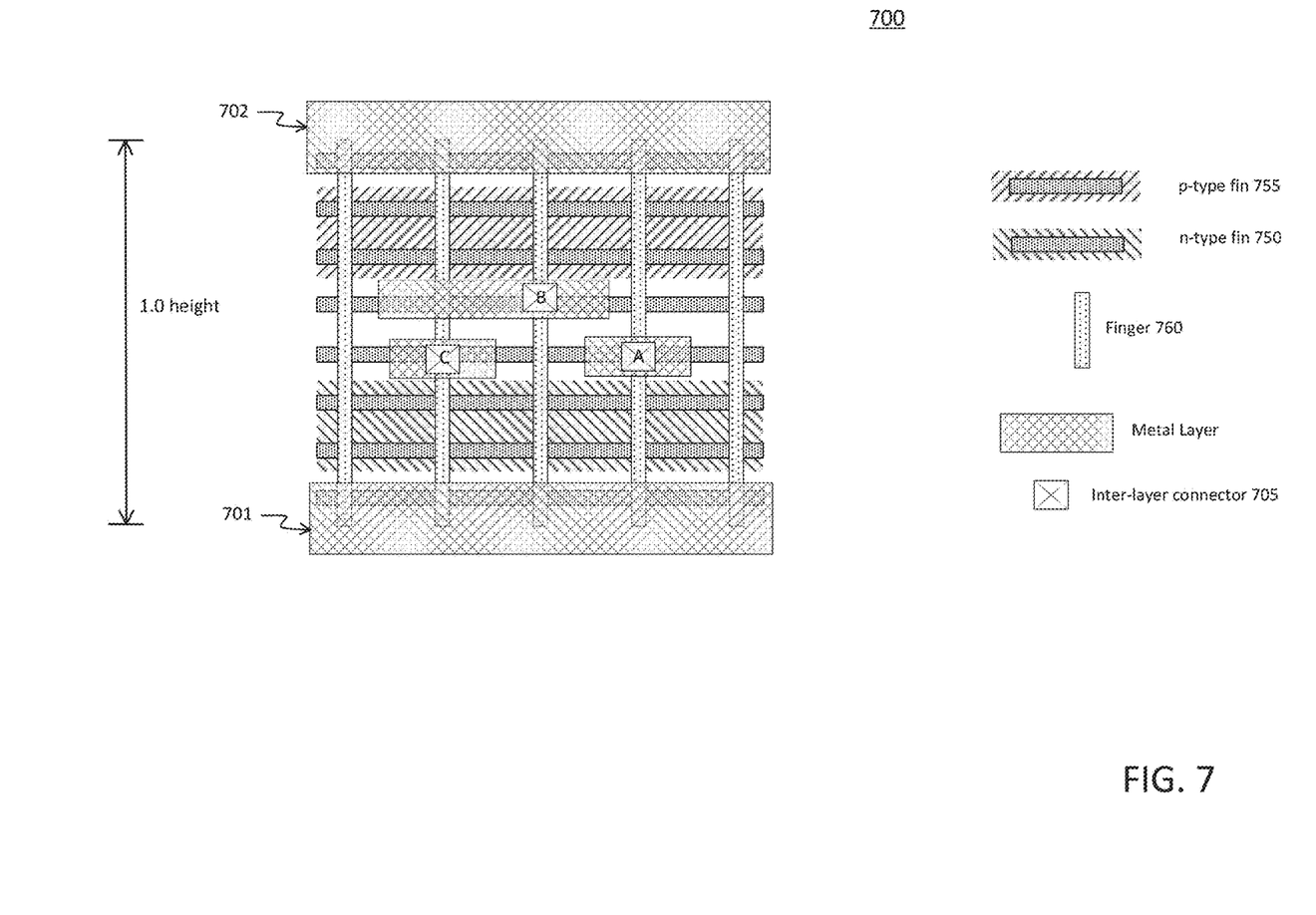
FIG. 7 is an illustration depicting an example standard-height NAND cell, in accordance with an embodiment.

FIG. 7 is an illustration depicting an embodiment 700 of an example single-height NAND cell layout for an example cell library. In an embodiment, example layout 700 may include a plurality of p-type diffusion fins, such as p-type fins 755, and/or a plurality of n-type diffusion fins, such as n-type fins 750. Further, in an embodiment, example single-height NAND cell layout 700 may include a plurality of fingers, such as fingers 760, aligned in a direction that is substantially orthogonal to fins 755 and/or 750. Example single-height NAND cell layout 700 may further comprise a metal layer including input terminals A, B, and C, as well as a VSS electrode 701 and a VDD electrode 702.

In an embodiment, example single-height NAND cell layout 700 may include 2 n-type fins, such as n-type fins 750, and/or may include 2 p-type fins, such as fins 755, for a beta ratio of 1:1. Also, in an embodiment, an example single-height NAND cell layout with poly half offset architecture, such as layout 700, may exhibit a contacted poly-pitch value of 5. "Contacted Poly-Pitch" (CPP) may be used to describe a width of a cell, such as cell 510, in terms of a number of polysilicon fingers, for example, arrayed according to specified pitch dimensions for a particular cell library across a particular cell. For example layout 700, CPP is 5, with 2 n-type fins 750 and 2 p-type fins 755.

Figure 8:
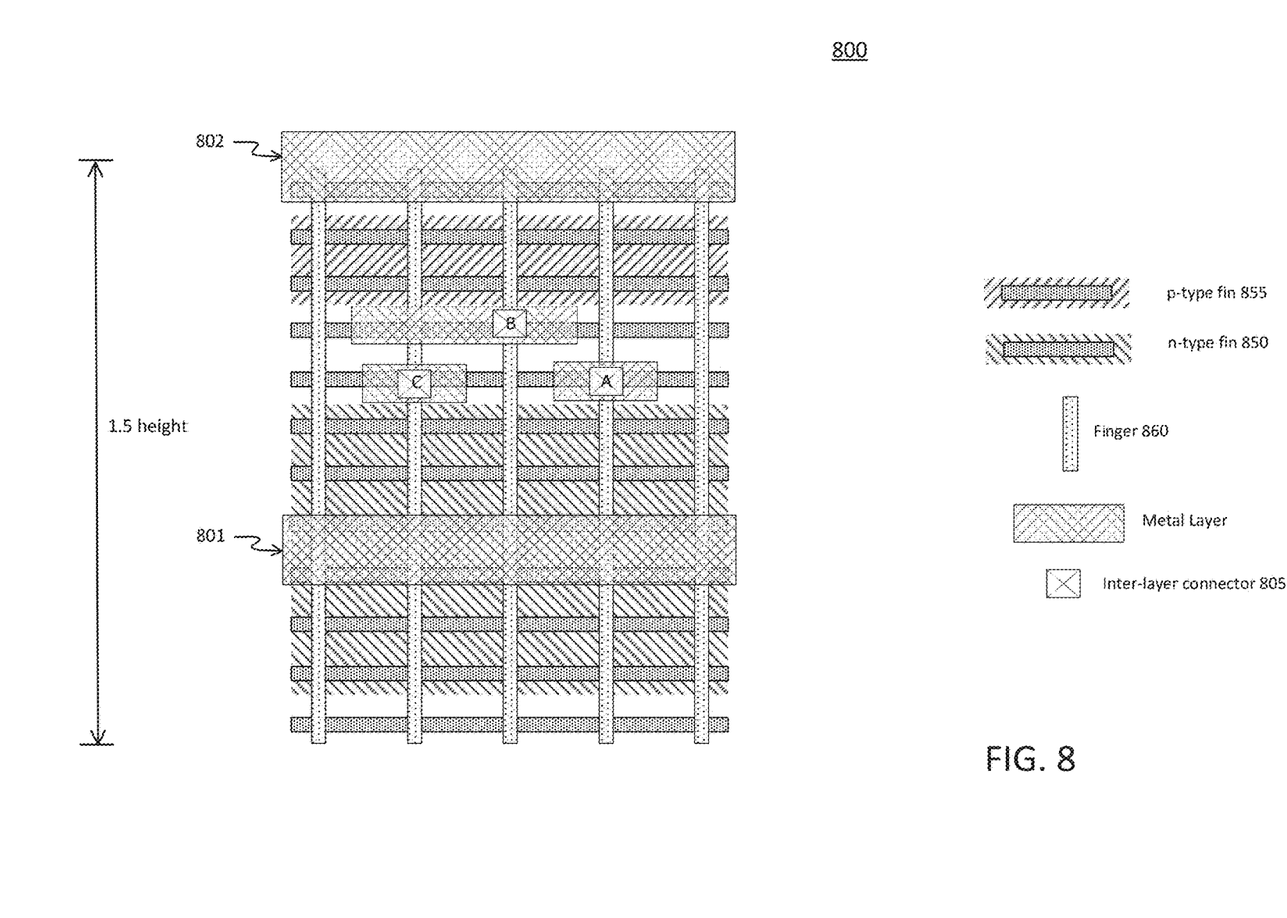
FIG. 8 is an illustration depicting an example fractional-height NAND cell, in accordance with an embodiment.

FIG. 8 is an illustration depicting an embodiment 800 of an example fractional-height NAND cell layout for an example cell library. In an embodiment, example layout 800 may include a plurality of p-type diffusion fins, such as p-type fins 855, and/or a plurality of n-type diffusion fins, such as n-type fins 850. Further, in an embodiment, example fractional-height NAND cell layout 800 may include a plurality of fingers, such as fingers 860, aligned in a direction that is substantially orthogonal to fins 855 and/or 850. Similar to example layout 600 discussed above, example fractional-height NAND cell layout 800 may comprise a metal layer including input terminals A, B, and C, as well as a VSS electrode 801 and a VDD electrode 802.

In an embodiment, example fractional-height NAND cell layout 800 may include 6 n-type fins, such as n-type fins 850, and/or may include 2 p-type fins, such as fins 855, for a beta ratio of 0.33. Also, in an embodiment, example fractional-height NAND cell layout 800 may exhibit a cell area value of 7.5 CPP (5 CPP multiplied by 1.5 height). In comparison, to create a single-height cell with 6 n-type fins, active transistors (e.g., A, B, and C poly) are folded (e.g., additional poly fingers added to a widened cell) 3 times, resulting in a cell area value of 11 CPP (e.g., 3 fingers for active transistors folded 3 times plus 2 dummy poly fingers on either side). It is apparent that the 7.5 CPP area value for example fractional-height NAND cell layout 800 is a smaller area than the 11 CPP area value for example single-height NAND cell layout 600, and that the device density will be greater for a fractional-height cell, in an embodiment.

Another potential advantage that may be realized through utilization of fractional-height transitional cells, such as example cells 610 and/or 800, for example, may include acceleration of relatively slow stack transistors in widely utilized cells including, but not limited to, NAND2, NAND3, NAND4, NOR2, NOR3, NOR4, AOI31, AOI211, OAI31, OAI211, etc. For example, rather than utilizing single-height cells having equal counts of n-type and/or p-type fins, embodiments may include fractional-height cells incorporating greater counts of n-type and/or p-type fins. Further, greater counts of fins may result in greater drive strength and/or quicker circuit operation as compared, for example, against standard-height cells having equal counts of n-type and/or p-type fins.

Although embodiments discussed herein may describe example cells having particular counts of n-type and/or p-type fins, other embodiments may utilize different counts of n-type and/or p-type fins. Similarly, claimed subject matter is not limited in scope to the particular examples discussed herein with respect to the various example cell types, configurations, heights, pitches, etc. For example, although single, 1.5, and/or double-height cells have been described in connection with embodiments herein, other embodiments may include other cell heights, such as 2.5, for example. For example, a beta ratio for a fractional-height transitional cell having a height that is 2.5 that of a standard cell may be characterized, in an embodiment, by beta ratio of 1.67, including 10 p-type fins and 6 n-type fins. Of course, claimed subject matter is not limited in scope in these respects.

Figure 9:
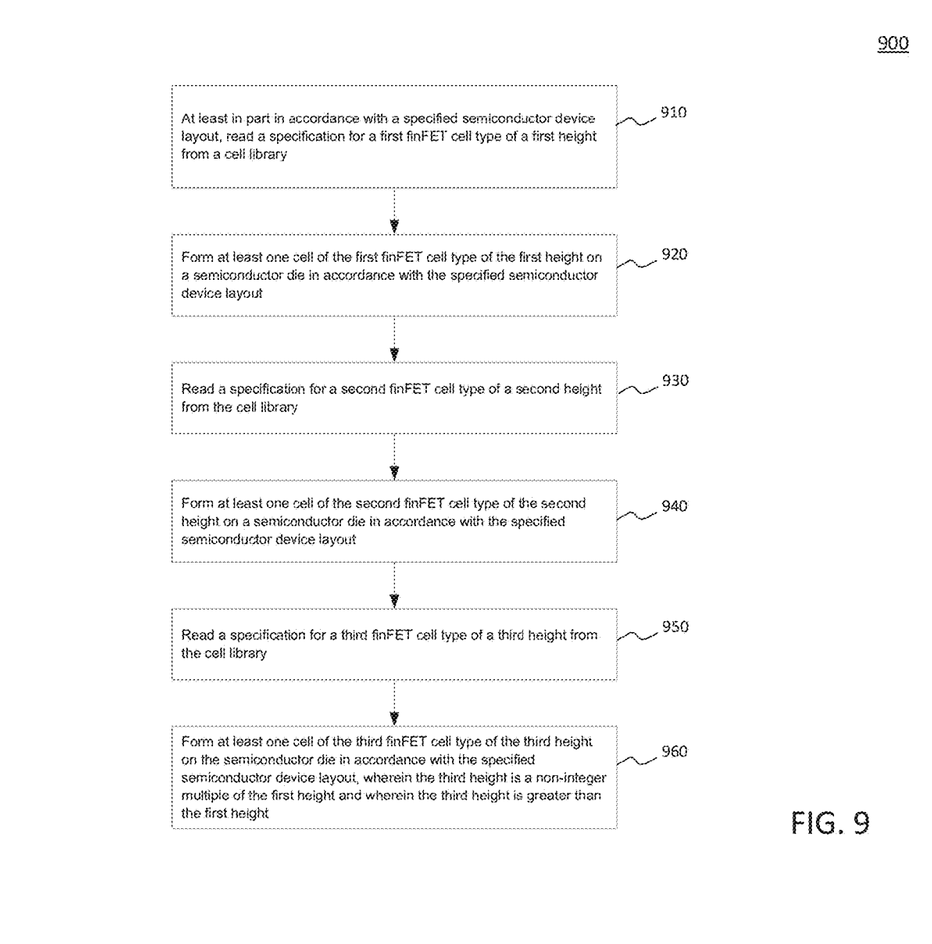
FIG. 9 in an illustration depicting an example process for forming fractional-height finFET cells on a semiconductor die, in accordance with an embodiment.

FIG. 9 in an illustration depicting an embodiment 800 of an example process for forming fractional-height finFET cells on a semiconductor die. Embodiments in accordance with claimed subject matter may include all of blocks 910-960, fewer than blocks 910-960, and/or more than blocks 910-960. Further, the order of blocks 910-960 is merely an example order, and subject matter is not limited in scope in these respects.

In an embodiment, a specification for a first finFET cell type of a first height may be read from a cell library stored in a memory of a computing device at least in part in accordance with a specified semiconductor device layout, as depicted at block 910. Further, in an embodiment, at least one cell of the first finFET cell type of the first height may be formed on a semiconductor die in accordance with the specified semiconductor device layout, as indicated at block 920. Additionally, as depicted at blocks 930 and 940, a specification for a second finFET cell type of a second height may be read from the cell library and at least one cell of the second finFET cell type of the second height may be formed on the semiconductor die in accordance with the specified semiconductor device layout, for example.

Further, in an embodiment, a specification for a third finFET cell type of a third height may be read from the cell library, as indicated at block 950. As further indicated at block 960, at least one cell of the third finFET cell type of the third height on the semiconductor die in accordance with the specified semiconductor device layout, wherein the third height is a non-integer multiple of the first height and wherein the third height greater than the first height, in an embodiment.

In an embodiment, forming the at least one cell of the third finFET cell type of the third height may include providing a transition between at least one cell of the first finFET cell type of the first height and at least one cell of the second finFET cell type of the second height. In an embodiment, a first height may comprise a standard cell height specified by a cell library and a second height may comprise a double cell height, for example. Additionally, in an embodiment, a third cell height may comprise a transitional cell height of approximately 1.5 times the standard cell height, for example.

In an embodiment, forming at least one cell of a third finFET cell type of a third height may include forming a first plurality fins of a first diffusion type aligned in a first direction and a second plurality of fins of a second diffusion type aligned in the first direction. Also, in an embodiment, a count of the first plurality of fins of the first diffusion type may be greater than a count of the second plurality of fins of the second diffusion type, for example. Further, forming a first plurality of fins of a first diffusion type may include forming one or more of the first plurality of fins of a first diffusion type positioned beneath a supply voltage electrode. Of course, claimed subject matter is not limited in scope in these respects.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

In the present patent application, in a particular context of usage, such as a situation in which tangible components (and/or similarly, tangible materials) are discussed above, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under," as used herein, are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes an underlayment embodiment, as one illustration, in which, for example, orientation at various times (e.g., during fabrication or application) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

It is further noted that the terms "type" and/or "like," as used herein, such as with a feature, structure, characteristic, and/or the like, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," if the minor variations are sufficiently minor so that the feature, structure, characteristic, and/or the like would still be considered to be substantially present with such variations also present. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An integrated circuit device, comprising:
a first cell including a first plurality fins of a first diffusion type aligned in a first direction and a second plurality of fins of a second diffusion type aligned in the first direction, wherein a count of the first plurality of fins of the first diffusion type is at least equal to a count of the second plurality of fins of the second diffusion type, wherein the first cell has a first cell height that is a non-integer multiple of a standard cell height greater than the standard cell height.

2. The integrated circuit device of claim 1, further comprising one or more second cells of the standard cell height and one or more third cells of a double standard cell height, wherein the first cell provides a transition between the one or more second cells of the standard cell height and the one or more third cells of the double cell height, and wherein one or more of the first plurality of fins of the first diffusion type are positioned under a supply voltage electrode.

3. The integrated circuit device of claim 1, wherein the first cell height comprises a cell height that is greater than the standard cell height by a fraction of the standard cell height.

4. The integrated circuit device of claim 1, wherein the first cell height is approximately 1.5 times the standard cell height.

5. The integrated circuit device of claim 4, wherein a ratio of the count of the first plurality of fins of the first diffusion type and the second plurality of fins of the second diffusion type is 3:1.

6. The integrated circuit device of claim 5, wherein the count of the first plurality of fins of the first diffusion type is 6 and the count of the second plurality of fins of the second diffusion type is 2.

7. The integrated circuit device of claim 1, wherein the first cell height is approximately 2.5 times the standard cell height, and wherein one or more of the second plurality of fins of the second diffusion type are positioned under a common source electrode.

8. The integrated circuit device of claim 7, wherein a ratio of the count of the first plurality of fins of the first diffusion type and the second plurality of fins of the second diffusion type is approximately 1.67:1.

9. The integrated circuit device of claim 8, wherein the count of the first plurality of fins of the first diffusion type is 10 and the count of the second plurality of fins of the second diffusion type is 6.

10. The integrated circuit device of claim 1, wherein the first diffusion type comprises an n-type diffusion and wherein the second diffusion type comprises a p-type diffusion.

11. The integrated circuit device of claim 1, wherein the first diffusion type comprises a p-type diffusion and wherein the second diffusion type comprises an n-type diffusion.

12. The integrated circuit of claim 1, further comprising a plurality of semiconductor fingers aligned in a second direction substantially orthogonal to the first direction.

13. A semiconductor device, comprising:
at least one first finFET cell of a first height;
at least one second finFET cell of a second height, wherein the second height is approximately an integer multiple of the first height; and
at least one third finFET cell of a third height, wherein the third height is a non-integer multiple of the first height and wherein the third height is greater than the first height.

14. The semiconductor device of claim 13, wherein the at least one first finFET cell, the at least one second finFET cell, and the at least one third finFET cell respectively to include a plurality of fins of a first diffusion type and a plurality of fins of a second diffusion type.

15. The semiconductor device of claim 14, wherein the at least one first finFET cell includes a plurality of fins of the first diffusion type and a plurality of fins of the second diffusion type, wherein the plurality of fins of the second diffusion type is equal in number to the plurality of fins of the first diffusion type.

16. The semiconductor device of claim 15, wherein the at least one third finFET cell includes a plurality of fins of the first diffusion type and a plurality of fins of the second diffusion type, wherein the plurality of fins of the second diffusion type is greater in number than the plurality of fins of the first diffusion type.

17. The semiconductor device of claim 16, wherein the third height is approximately 1.5 times the first height and wherein the second height is approximately 2.0 times the first height.

18. The semiconductor device of claim 16, wherein the third height is approximately 2.5 times the first height and wherein the second height is approximately 2.0 times the first height.

19. The semiconductor device of claim 13, wherein the at least one third finFET cell to provide a transition between a region comprising the at least one first finFET cell and a region comprising the at least one second finFET cell.

20. A method, comprising:
at least in part in accordance with a specified semiconductor device layout:
reading a specification for a first finFET cell type of a first height from a cell library stored in a memory of a computing device;
forming at least one cell of the first finFET cell type of the first height on a semiconductor die in accordance with the specified semiconductor device layout;
reading a specification for a second finFET cell type of a second height from the cell library;
forming at least one cell of the second finFET cell type of the second height on the semiconductor die in accordance with the specified semiconductor device layout;
reading a specification for a third finFET cell type of a third height from the cell library; and
forming at least one cell of the third finFET cell type of the third height on the semiconductor die in accordance with the specified semiconductor device layout, wherein the third height is a non-integer multiple of the first height and wherein the third height is greater than the first height.

21. The method of claim 20, wherein the forming the at least one cell of the third finFET cell type of the third height includes providing a transition between the at least one cell of the first finFET cell type of the first height and the at least one cell of the second finFET cell type of the second height.

22. The method of claim 21, wherein the first height comprises a standard cell height specified by the cell library, wherein the second height comprises a double cell height, and wherein the third cell height comprises a fractional cell height of approximately 1.5 times the standard cell height.

23. The method of claim 21, wherein the first height comprises a standard cell height specified by the cell library, wherein the second height comprises a double cell height, and wherein the third cell height comprises a fractional cell height of approximately 2.5 times the standard cell height.

24. The method of claim 21, wherein the forming the at least one cell of the third finFET cell type of the third height includes forming a first plurality fins of a first diffusion type aligned in a first direction and a second plurality of fins of a second diffusion type aligned in the first direction, wherein a count of the first plurality of fins of the first diffusion type is greater than a count of the second plurality of fins of the second diffusion type.

25. The method of claim 24, wherein the forming the first plurality of fins of the first diffusion type includes forming one or more of the first plurality of fins of the first diffusion type to be positioned under a supply voltage electrode.

\* \* \* \* \*